US005757524A

United States Patent [19]
Rupp

[11] Patent Number: 5,757,524
[45] Date of Patent: May 26, 1998

[54] NORMALLY WHITE MULTIGAP TWISTED NEMATIC LIQUID CRYSTAL DISPLAY WITH REDUCED HUE VARIATION OVER VIEWING ANGLE

[75] Inventor: John A. Rupp, Cedar Rapids, Iowa

[73] Assignee: Rockwell International, Seal Beach, Calif.

[21] Appl. No.: 226,628

[22] Filed: Apr. 12, 1994

[51] Int. Cl.⁶ .................................................. G02F 1/1335
[52] U.S. Cl. .................................................. 359/68; 359/63
[58] Field of Search .................................. 359/68, 63, 93, 359/102

[56] References Cited

U.S. PATENT DOCUMENTS

| | | | |
|---|---|---|---|
| 4,527,864 | 7/1985 | Dir | 359/63 |
| 4,632,514 | 12/1986 | Ogawa et al. | 359/68 |
| 5,150,235 | 9/1992 | Haim et al. | 359/68 |
| 5,237,437 | 8/1993 | Rupp | 359/68 |

FOREIGN PATENT DOCUMENTS

| | | | |
|---|---|---|---|
| 60-159824 | 8/1985 | Japan | 359/68 |
| 61-121033 | 6/1986 | Japan | 359/68 |
| 62-69234 | 3/1987 | Japan | 359/68 |

OTHER PUBLICATIONS

Bahadur, "Liquid Crystal Applications and Uses", vol. 1, B pp. 231–274, 1990.

*Primary Examiner*—Anita Pellman Gross
*Assistant Examiner*—James A. Dudek
*Attorney, Agent, or Firm*—Gregory G. Williams; M. Lee Murrah; George A. Montanye

[57] ABSTRACT

A normally white twisted nematic liquid crystal display which uses multigap liquid crystal cells where the gaps are selected to have a cell gap which is less than that which would produce a maximum transmittance during an on-state and thereby provides for reduced hue variation over viewing angle.

6 Claims, 5 Drawing Sheets

NORMALLY WHITE MULTIGAP TWISTED NEMATIC LIQUID CRYSTAL DISPLAY WITH REDUCED HUE VARIATION OVER VIEWING ANGLE

FIELD OF THE INVENTION

This invention generally relates to liquid crystal displays and more particularly to normally white multigap twisted nematic liquid crystal displays.

BACKGROUND OF THE INVENTION

In the past, display engineers have utilized a multigap approach such as suggested in U.S. Pat. No. 4,632,514 entitled "Color Liquid Crystal Display Apparatus" issued to Ogawa et al. which patent is incorporated herein in its entirety by this reference. This patent generally suggests that different liquid crystal cell gap dimensions be utilized for the different dots therein with their associated color filter areas in such a way, that the Gooch and Tarry transmission curves for each of the red, green and blue colors are nearly coincident. The wavelength of interest for each of the red, green and blue colors are centered at the first maximum at each of the red, green and blue curves. While this approach is suggested in Ogawa et al. as a way to improve color performance and contrast over viewing angle, it has some limitations when good color performance over a wide horizontal viewing angle is desired.

One approach at reducing contrast variation in a normally black twisted nematic display over viewing angle is described in U.S. Pat. No. 5,237,437 entitle "Apparatus and Method For a High Contrast Wide Angle Color Flat Panel Liquid Crystal Display" issued to John A. Rupp which patent is incorporated herein in its entirety by this reference. The Rupp patent suggests the selection of cell gaps for each dot or subpixel which are less than the cell gaps which would produce a minimum transmittance in the off-states of the normally black display. Moreover, the Rupp display does not teach reduction of hue variation in either a normally black or a normally white display. Additionally, Rupp does not examine, teach or even suggest the desirability of deviations from cell gaps that would produce the maximum transmittance in the on-state.

Consequently, there exists a need in the display industry for improvements of normally white twisted nematic liquid crystal displays which exhibit reduced hue variation over wide horizontal viewing angles.

SUMMARY OF THE INVENTION

It is an object of the present invention to provide a normally white multigap twisted nematic liquid crystal display with improved display characteristics.

It is a feature of the present invention to include a liquid crystal cell structure having multiple cell gaps therein for the red, blue and green colors where the cell gaps have been selected at a lesser dimension, then that which would be expected in a standard multigap LCD, so that the transmission on axis is less than the first Gooch-Tarry maximum attainable for each of the red, green and blue colors.

It is an advantage of the present invention to provide a liquid crystal display with reduced hue variation over viewing angles.

The present invention includes a multigap LCD where the different cell gaps for the different color filters are selected at a thickness less than the thickness that would provide for maximum transmission.

BRIEF DESCRIPTION OF THE DRAWINGS

The invention may be more fully understood by reading the following detailed description, in conjunction with the appended drawings, wherein.

DETAILED DESCRIPTION

Figure 1:
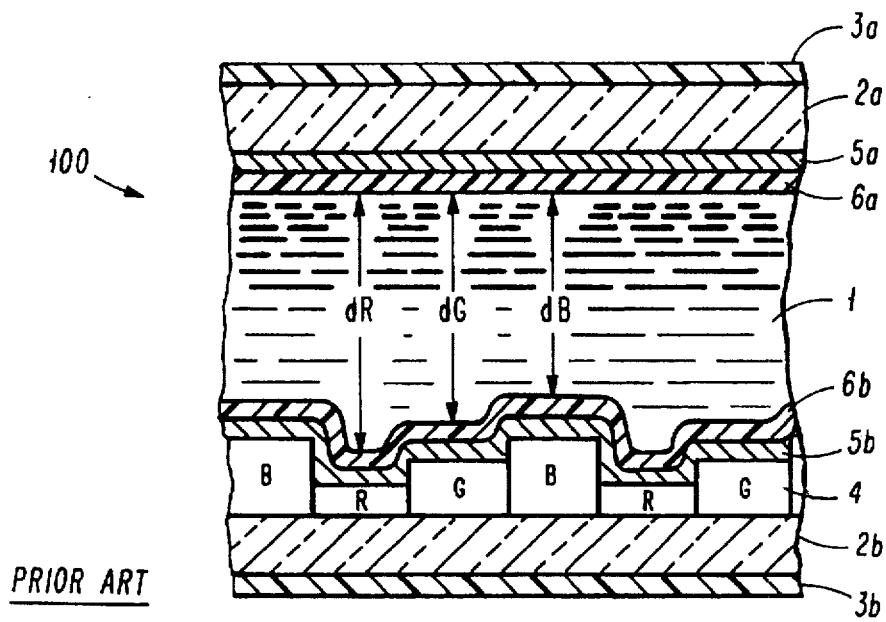
FIG. 1 is a cross sectional representation of a liquid crystal display which utilizes the prior art multigap approach where the cell gaps are different for red, green and blue filters.

Now referring to FIG. 1, there is shown a liquid crystal display, of the prior art, generally designated 100 having a liquid crystal medium 1 therein which has different gaps dR, dG, and dB for the dots therein corresponding to the red, green and blue filters 4. Disposed on either side of liquid crystal medium 1 are liquid crystal alignment films 6a and 6b. Disposed adjacent to liquid crystal alignment film 6a is pixel electrode 5a. Disposed adjacent to liquid crystal alignment film 6b is common electrode 5b. Disposed adjacent to pixel electrode 5a is glass 2a which has a polarizer 3a disposed thereon. Adjacent to filters 4 is glass layer 2b and polarizer 3b. Polarizers 3a and 3b are orthogonally oriented in a normally white display.

Figure 2:
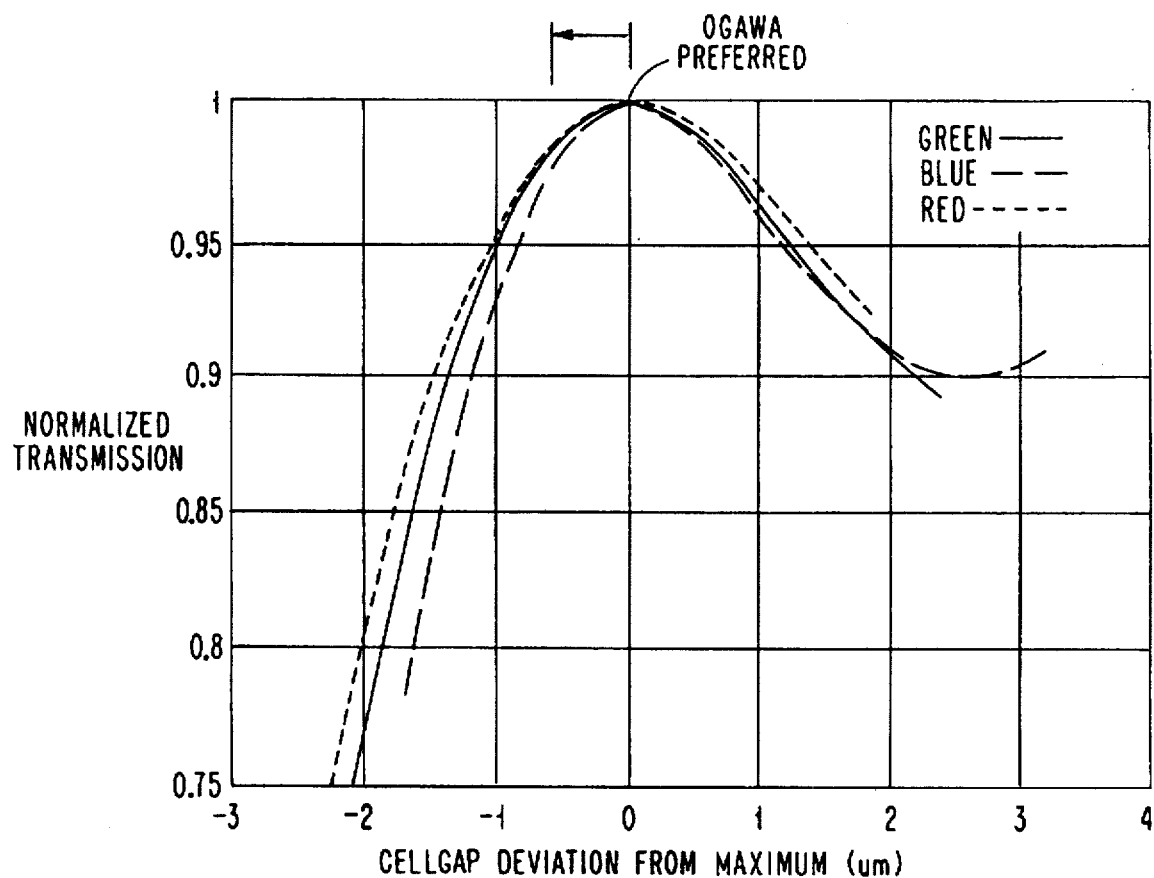
FIG. 2 is a normalized transmission versus deviation from maximum cell gap plot for a normally white multigap liquid crystal display of the present invention with three lines one representing green, blue and red.

Now referring to FIG. 2, there is shown a Normalized Transmission versus Cell Gap Deviation from Maximum graph which shows three separate curves wherein the solid line corresponds to the Gooch-Tarry curves for green and where the blue curve is represented by dashed lines and the red curve is represented by dots. The term normalized refers to curves superimposed where all three curves are at the proper cell gap for coincident maximums.

The apex of the curves are shown to be coincident at a point. This is where the Ogawa reference teaches the preferred operating cell gaps. For example, the red filter may have a cell gap greater than the green cell gap which is greater than the blue cell gap. The differences in cell gaps being chosen to result in maximum transmission.

As the viewing angle deviates from normal in the horizontal viewing direction, the cell gap deviations from maximum move to the right on these curves which clearly show that the transmission drops as the observer moves horizontally.

The present invention provides some of its beneficiary aspects by deviating from the maximum position taught by the Ogawa reference and operating at cell gaps having less than the Ogawa preferred cell gaps. This provides for a wider horizontal viewing angle with acceptable deviations from total transmission and a wider horizontal viewing angle were the differences between the individual color curves are minimized thereby reducing hue variation over a wider viewing angle.

The amount of deviation from the Ogawa preferred cell gaps will be a matter of designer's choice depending upon the actual shape of the red, green and blue curves and the actual liquid crystal material, color filters, and the spectrum of the backlight used as well as requirements for horizontal viewing angle.

It is believed that the preferred amount of deviation from the Ogawa maximum can be determined by modeling several different cell gap deviations and determining from these models the most desirable.

The industry standard for determining acceptability of performance of chromaticity over viewing angle is generally known in the industry as chromaticity tolerance defined by the following equation which takes into account luminance as well as specific chromaticity.

$$\text{Field of View } (FOV) \text{ Chroma Tolerance} = 13L° \sqrt{\Delta u'^2_{fov} + \Delta v'^2_{fov}}$$

Where: $\Delta u'_{fov}$=CIE 1976 u' from ERP measurement minus CIE 1976 u' from FOV measurements $\Delta v'_{fov}$=CIE 1976 v' from ERP measurement minus CIE 1976 v' from FOV measurements $L°=116(L_m/Y_n)^{1/3}-16$ $L_m$=Measured Luminance $Y_n$=Object Color Stimulus The calculated FOV chroma tolerance shall not exceed specific customer requirement.

The value of this equation can be plotted over the required viewing angles so as to determine the maximum levels over those viewing angles. It is the objective of this analysis to determine those cell gaps for which any of the primary or secondary colors of interest begin to increase beyond the generally observed peak. At that point cell gap is tending to become unacceptable in many aviation applications.

Figure 3:
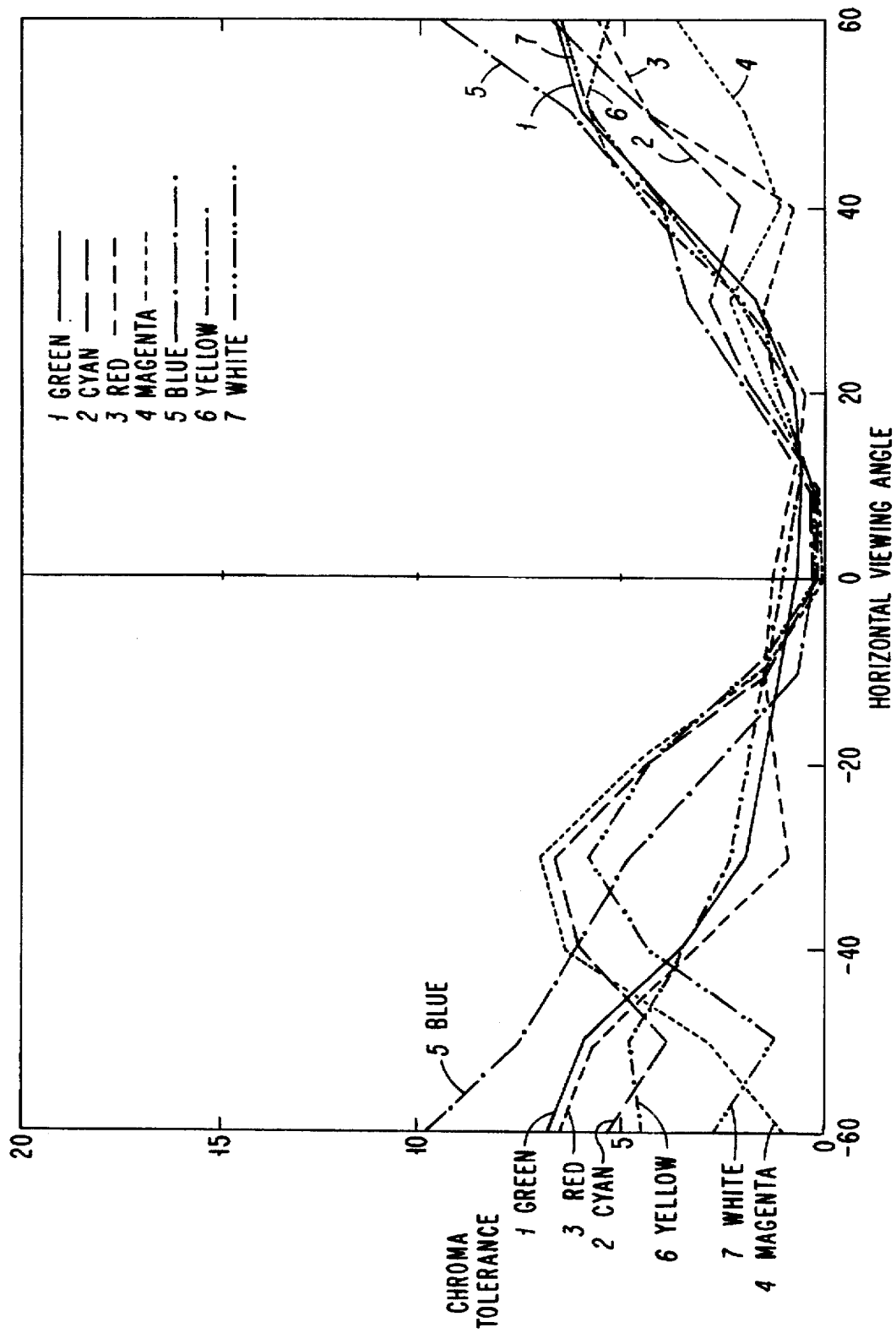
FIG. 3 is a chromaticity tolerance versus horizontal viewing angle plot for a multigap maximum transmission level for a display of the present invention.

Now referring to FIG. 3 there is shown a chromaticity tolerance versus horizontal viewing angle plot for a maximum such as taught by the Ogawa reference. Seven different lines are plotted wherein line number 1 is green, line number 2 is cyan, line 3 is red, line 4 is magenta, line 5 is blue, line 6 is yellow and line 7 is white. On FIG. 3 it can be seen that line 5 is tending to increase beyond 40 degrees. The majority of some of the other lines also are tending to increase beyond 40 degrees.

Figure 4:
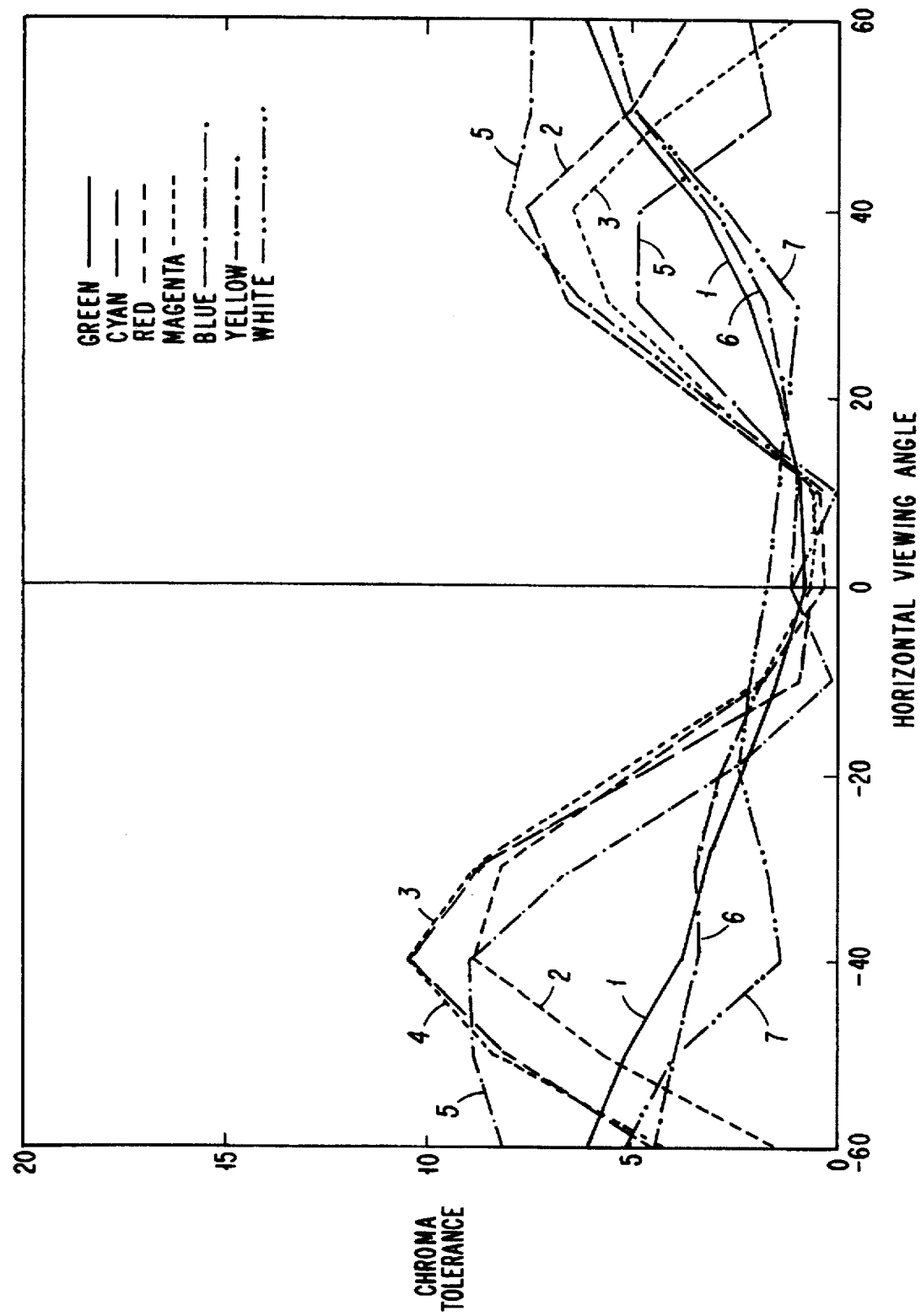
FIG. 4 is a chromaticity tolerance versus horizontal viewing angle graph of a 0.3 micron sub-maximum for a display of the present invention.

Now referring to FIG. 4, there is shown a chromaticity tolerance versus horizontal viewing angle plot which is similar in form to FIG. 3 of a 0.3 micron sub-maximum. At 0.3 micron sub-maximum, it is observed that beyond 40 degrees horizontal viewing angle the general trend for chromaticity tolerance is a preferred decrease.

Figure 5:
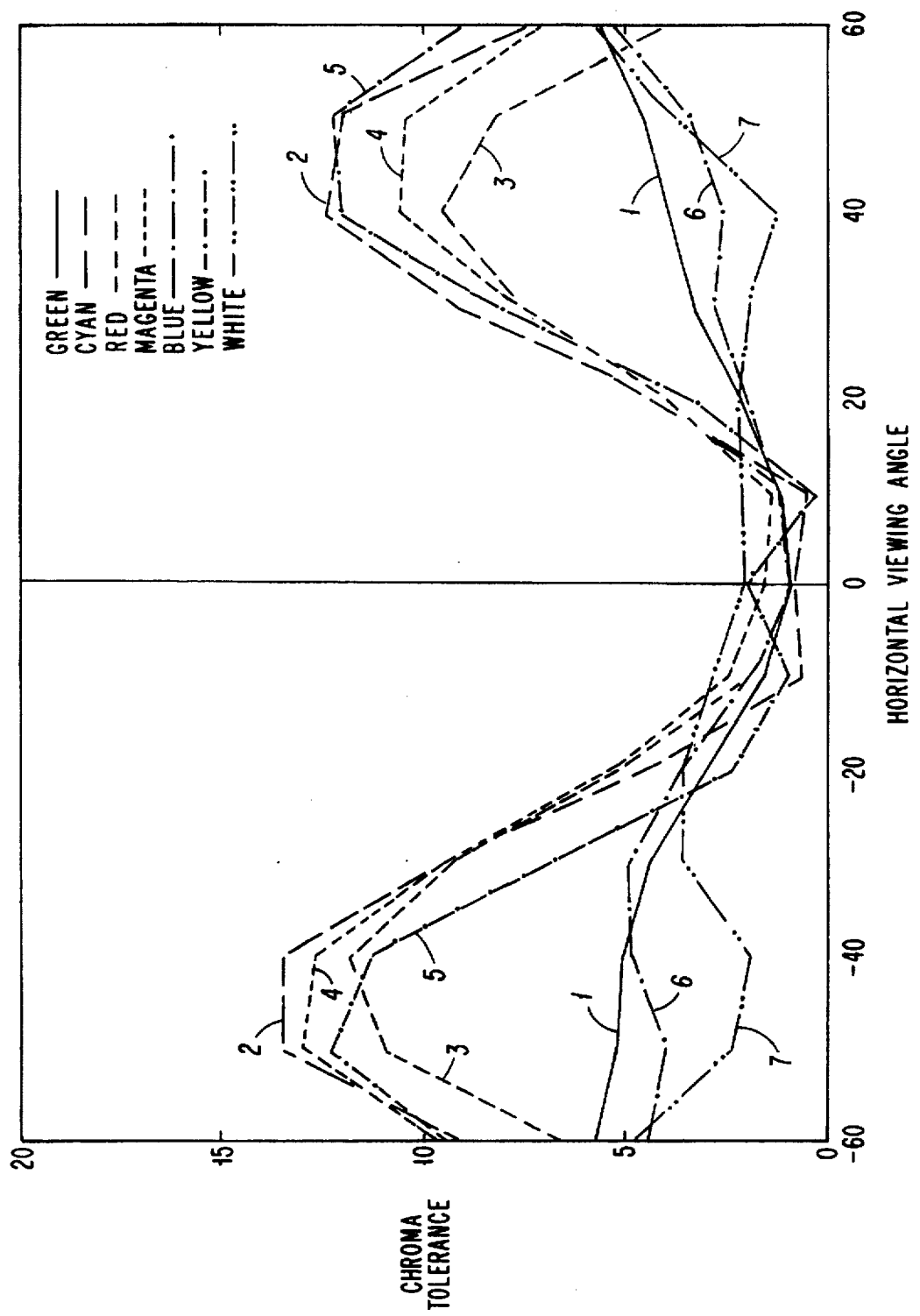
FIG. 5 is a chromaticity tolerance versus horizontal viewing angle for a 0.7 micron sub-maximum for a display of the present invention.

Now referring to FIG. 5, it is shown that at 0.7 micron sub-maximum, there tends to exist a general increase both in the absolute values around 40 degrees as well as relatively high peak levels beyond 40 degrees.

FIGS. 4 and 5 depict an equal deviation in thickness for red, green, and blue from the cell gaps which produce maximum transmission for red, green and blue respectively. However if ultra high performance is desired, the amount of thickness deviation could be different for each color red, green and blue to accommodate for the different concavity of the red, green and blue curves at the first local maximum.

Figure 6:
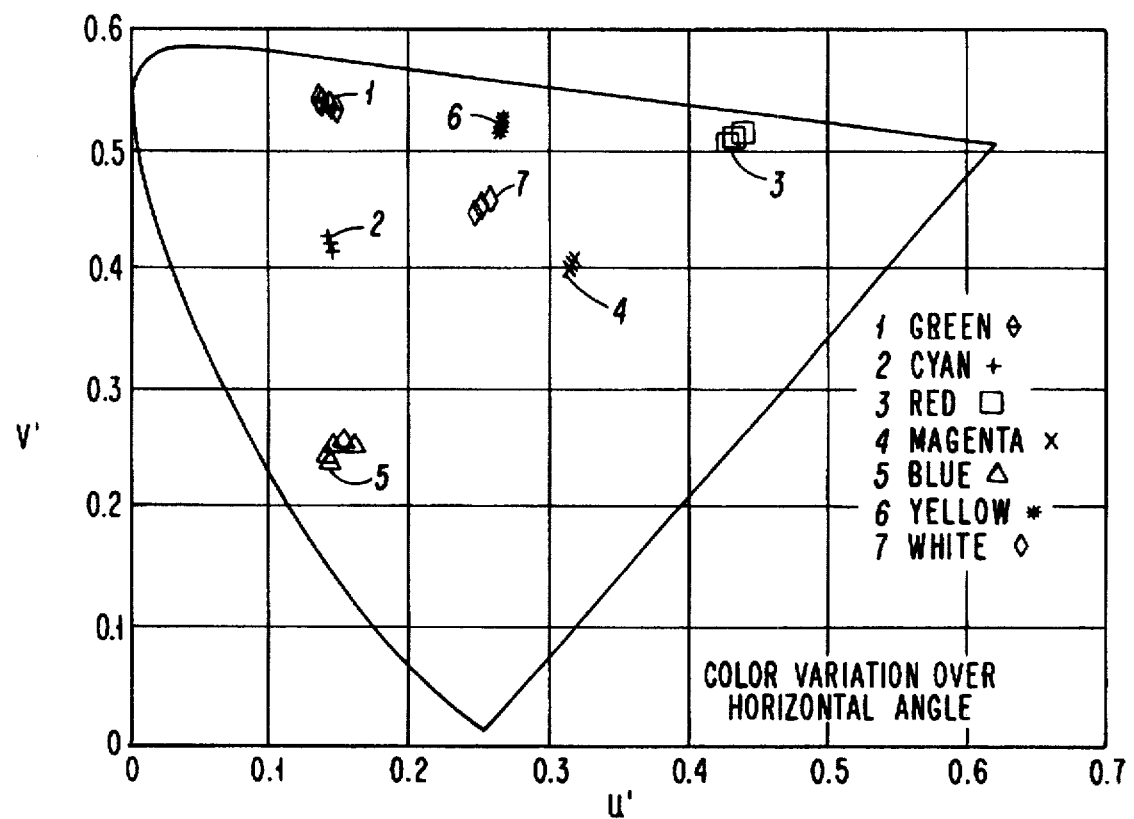
FIG. 6 is a chromaticity plot of left and right 60 degrees horizontal angle for 0.3 microns sub-maximum cell gap for a display of the present invention.

FIG. 6 represents a standard chromaticity chart used in the display industry. The objective in the visible color space defined within the outlines of the diagram is to minimize the excursions in the vertical and horizontal directions of each of the colors of interest. The figure represents total color excursions or changes in hue for green, cyan, red, magenta, blue, yellow and white over a left and right 60 degrees horizontal viewing angle.

It is believed that a preferred mode for carrying out the present invention would be a liquid crystal display as described herein which is used in conjunction with an optical compensator such as described in U.S. Pat. No. 5,196,953 entitled "Compensator For Liquid Crystal Display Having Two Types Of Layers With Different Refractive Indicies Attenuating", issued on Mar. 23, 1993, which produces a high contrast over a predetermined viewing angle.

The foregoing description is included to illustrate the operation and construction of the preferred embodiment of the present invention and it is not intended to limit the scope of the invention. The scope of the invention is defined in the following claims. For the foregoing description, many variations will be apparent to those skilled in the art and such variations are intended to be included within the spirit and scope of the invention.

What is claimed is:

1. A normally white twisted nematic liquid crystal display comprising:
   a first polarizer having a first transmission axis oriented in a first direction;
   a second polarizer having a second transmission axis oriented in a second direction;
   said first direction being orthogonal to said second direction;
   a first plurality of color filters for transmitting a first predetermined color, said first plurality of color filters being disposed between said first and said second polarizers;
   a second plurality of color filters for transmitting a second predetermined color, said second plurality of color filters being disposed between said first polarizer and said second polarizer;
   a liquid crystal medium disposed between said first and said second polarizers and between said first polarizer and said pluralities of color filters, said liquid crystal medium having a first plurality of first dots therein with each of said first dots having a predetermined cell gap and, a plurality of second dots wherein each of said second dots has a second predetermined cell gap;
   said first predetermined cell gap being less, by a first predetermined amount, than a cell gap which would produce a maximum transmission for said first predetermined color; and
   said second predetermined cell gap being less, by a second predetermined amount, than a cell gap which would produce a maximum transmission for said second predetermined color.

2. A display of claim 1 wherein said first predetermined amount and said second predetermined amount are equal.

3. A display of claim 1 wherein said first predetermined amount and said second predetermined amount are a function of the concavity of the first local maximum of the transmission versus thickness curves for said first predetermined color and said second predetermined color.

4. A display comprising:
   a first linear polarizer, having a backlight side and a viewer side, and having a first transmission axis disposed in a first direction;

a liquid crystal medium, being subdivided into a plurality of subpixels;

said plurality of subpixels being composed of a plurality of red subpixels, a plurality of green subpixels, and plurality of blue subpixels;

the thickness of said liquid crystal medium having a first predetermined thickness for said plurality of red subpixels, a second predetermined thickness for said plurality of green subpixels, and a third predetermined thickness for said plurality of blue subpixels;

said first predetermined thickness being thinner than a first predetermined maximum transmission thickness by a first predetermined deviation;

said second predetermined thickness being thinner than a second predetermined maximum transmission thickness by a second predetermined deviation;

said third predetermined thickness being thinner than a third predetermined maximum transmission thickness by a third predetermined deviation;

a plurality of color filter elements optically coupled with said liquid crystal medium, said plurality of color filter elements being composed of a plurality of red filter elements, a plurality of green filter elements, and a plurality of blue filter elements;

said plurality of red filter elements being optically coupled with said plurality of red subpixels, said plurality of green filter elements being optically coupled with said plurality of green subpixels and said plurality of blue color filter elements being optically coupled with said plurality of blue subpixels; and, a second linear polarizer having a second transmission axis disposed in a second direction where the second direction is perpendicular to the first direction.

5. A display of claim 4 wherein said first predetermined deviation, said second predetermined deviation, and said third predetermined deviation are equal.

6. A display of claim 4 wherein said first predetermined deviation, said second predetermined deviation and said third predetermined deviation are determined as a function of a difference in a concavity of a first local maximum of a Gooch-Tarry curve for a predetermined color associated with said plurality of red subpixels, said plurality of green subpixels, and said plurality of blue subpixels.

* * * * *